Patented June 9, 1931

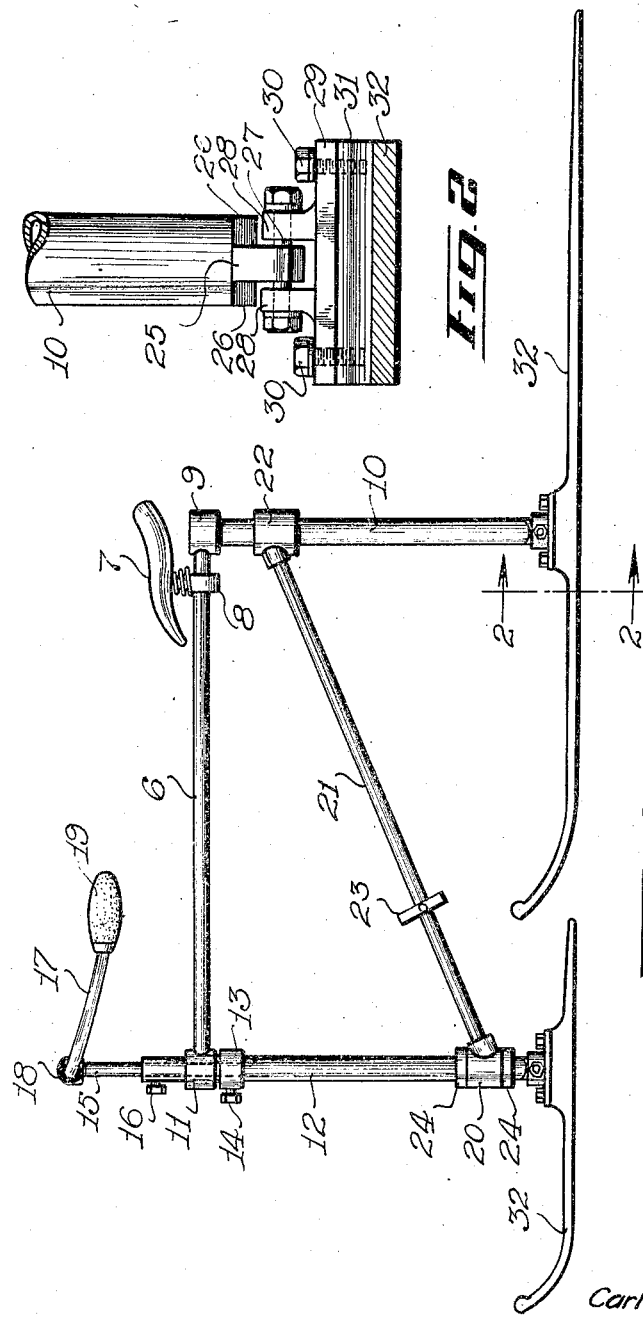

1,809,295

UNITED STATES PATENT OFFICE

CARL E. B. GUNDERSEN, OF ENTWISTLE, ALBERTA, CANADA

SKI-COASTER

Application filed March 8, 1929. Serial No. 345,379.

This present invention relates to new and useful improvements in a ski-coaster and has for its primary object the provision of a simple and inexpensive structure in which both the forward and rear skis are hingedly mounted on the upstanding frame so that they may properly engage the surface and reduce to the minimum, liability of breaking, unnecessarily straining or injuring any of the parts of the structure or the connections between such parts.

Another object of the invention resides in the provision of a ski-coaster of the character stated which is of extremely simple and inexpensive construction, is composed of the minimum number of parts and includes a strong frame composed of tubular members firmly connected with one another and supporting adjustable steering handles and an adjustable seat, whereby the device may be adjusted to suit the requirements of the coaster.

A further object of the invention resides in the provision of a ski-coaster of the character stated in which a special brace bar is provided for the upstanding forward and rear frame members and has its lower end firmly united with the forward upstanding frame member near the lower end thereof, while the upper end of the brace bar is firmly united with the rear upstanding frame member near the upper end of the latter.

To the accomplishment of these and related objects as shall become apparent as the description proceeds, my invention resides in the construction, combination and arrangement of parts as shall be hereinafter more fully described, illustrated in the accompanying drawings and pointed out in the claim hereunto appended.

The invention will be best understood and can be more clearly described when reference is had to the drawings forming a part of this disclosure, wherein like characters indicate like parts throughout the several views.

In the drawings:—

Figure 1 is an elevation of the improved ski-coaster; and

Figure 2 is an enlarger detail cross section, taken substantially on the plane of line 2—2 of Figure 1, looking in the direction indicated by the arrows.

Referring more in detail to the drawings, it is to be noted that the frame includes a transverse upper member 6 on which the seat 7 is mounted for longitudinal adjustment thereof, by suitable mounting means 8 which is adjustable along the member 6. A collar 9 is carried at the rear end of the upper frame member 6 and the upper extremity of the rear upstanding frame member 10 is secured in the collar 9. A similar collar 11 is carried on the forward end of the upper frame member 6 and has working therein the upper end of the forward upstanding frame member 12. The bearing collar 13 is secured on the frame member 12 just below the collar 11, by a set screw 14 or the like. The upstanding handle supporting bar 15 is adjustable vertically in the upper end of the frame member 12 and also rotatably adjustable therein. A set screw 16 is employed for securing the handle supporting bar in adjusted position and the diverging handle bars 17 are secured on the connection 18 carried at the upper extremity of the handle supporting bar 15, appropriate hand grips 19 being carried on the free ends of the handle bars 17. The lower end portions of the forward upstanding frame member 12 is rotatable in the collar 20 carried on the lower end of the rearwardly inclined frame bracing member 21, on the upper end of which is carried the collar 22 surrounding and firmly secured on the rear upstanding frame member 10, near the upper end thereof. The frame bracing member 21 carries laterally directed foot rests 23 near its lower end for engagement by the feet of the coaster when coasting down inclines. A pair of stop collars 24 are secured on the forward frame members 12 above and below the collar 20 to prevent independent vertical movement of the frame member 12 or the collar 20.

Each of the upstanding frame members 10 and 12 has a bearing lug 25 depending centrally from its lower extremity 26 which is rounded or convex from front to back on either side of the depending lug 25. A transverse pivot bolt 27 is extended through each lug 25 and also through upstanding bearing lugs 28 carried on the upper face of a bearing plate 29, which latter is secured by suitable securing members 30 on the raised or thickened portion 31 of a ski runner 32. The rear ski runner 32 is considerably longer than the forward or steering ski runner 32. It is also to be understood that the rear ski runner 32 is not capable of turning to either side but the forward ski runner 32 is turned by operation of the handle 17.

As the construction of the device has thus been described in detail, brief reference is now had to its use and modus operandi: The handle supporting bar 15 is adjusted in the forward frame member 12 and secured in adjusted position by the set screw 16. The seat 7 is also adjusted on the upper frame member 6 and the device is propelled by the feet, except when going down inclines at which times the feet may be placed on the foot rests 23. The steering device is accomplished by the handle bars 17 and owing to the pivotal mounting of the ski runners 32, they may readily give either forwardly or rearwardly of their respective pivotal mountings when travelling over uneven surfaces, thus eliminating danger of injury to the device. All of the frame members and the frame bracing member may be constructed of tubing as disclosed or a board of appropriate width may be substituted for the upper frame member 6 and other parts of the frame structure altered as required.

From the foregoing description taken in connection with the accompanying drawings, it will be manifest that a ski-coaster is provided that will fulfill all the necessary requirements of such a device, but as many changes could be made in the above description, and many apparently widely different embodiments of my invention may be constructed within the scope of the appended claim without departing from the spirit or scope thereof, it is intended that all matters contained in the said accompanying specification and drawings shall be interpreted as illustrative and not in a limited sense.

Having thus described my invention, what I claim as new and desire to secure by Letters Patent is:—

A ski-coaster including upstanding forward and rear frame members connected at their upper ends by an upper longitudinal frame member; said upstanding frame members also being connected by an incline frame bracing member attached to the upstanding rear frame member near the upper end of the latter and mounted on the upstanding forward frame member near the lower end thereof; each of said upstanding frame members having a rounded lower extremity with a central lug depending therefrom; a pivot bolt extended transversely through each of said lugs; forward and rearward ski runners having raised portions intermediate their ends; and bearing plates carried on said raised portions with pairs of upstanding bearing lugs; one of said pivot bolts being extended through the pair of upstanding bearing lugs of one of said bearing plates.

In testimony whereof I hereunto affix my signature.

CARL E. B. GUNDERSEN. [L. S.]